April 11, 1961 F. S. KNOLL 2,979,122

CHAIR FRAME AND SUPPORTING STRUCTURE

Original Filed June 29, 1956 6 Sheets-Sheet 1

INVENTOR.
FLORENCE S. KNOLL
BY Lester W. Clark
ATTORNEY

CHAIR FRAME AND SUPPORTING STRUCTURE

Original Filed June 29, 1956 6 Sheets-Sheet 2

INVENTOR.
FLORENCE S. KNOLL
BY Lester W. Clark
ATTORNEY

CHAIR FRAME AND SUPPORTING STRUCTURE

Original Filed June 29, 1956

INVENTOR.
FLORENCE S. KNOLL
BY Lester W. Clark
ATTORNEY

CHAIR FRAME AND SUPPORTING STRUCTURE

Original Filed June 29, 1956 6 Sheets-Sheet 4

INVENTOR.
FLORENCE S. KNOLL
BY Lester W. Clark
ATTORNEY

INVENTOR.
FLORENCE S. KNOLL
BY Lester W. Clark
ATTORNEY

CHAIR FRAME AND SUPPORTING STRUCTURE

Original Filed June 29, 1956

6 Sheets-Sheet 6

INVENTOR.
FLORENCE S. KNOLL
BY Lester W. Clark
ATTORNEY

United States Patent Office 2,979,122

Patented Apr. 11, 1961

2,979,122

CHAIR FRAME AND SUPPORTING STRUCTURE

Florence S. Knoll, New York, N.Y., assignor, by mesne assignments, to Knoll Associates, Inc., a corporation of New York Original application June 29, 1956, Ser. No. 594,740. Divided and this application Sept. 22, 1958, Ser. No. 762,530

10 Claims. (Cl. 155—191)

This invention relates to chairs, sofas or the like generally and particularly to improved frame and supporting structures for chairs, sofas or the like.

This is a division of my prior application Ser. No. 594,740, filed June 29, 1956, entitled "Chair or the Like," which prior application is a continuation-in-part of my previously filed application Ser. No. 451,237, filed August 20, 1954, entitled "Support for an Article of Furniture," now Patent No. 2,796,307, issued June 18, 1957.

An object of the invention is to provide a chair or sofa construction which is improved from the standpoint of the comfort of the person sitting in the chair.

Another object is to provide an upholstered chair or sofa which is improved from the standpoint of its appearance.

A further object is to provide, in an upholstered chair of the type described, an improved frame structure in which some of the frame members are concealed.

Another object is to provide an improved chair structure which lends itself to ease and economy of manufacture.

Another object is to provide an improved framework for a chair or sofa.

The foregoing objects are attained in the structures described herein by providing a framework including a pair of vertical rear legs connected at the top by a back engaging crossbar, a pair of front legs, and a pair of side rails connecting the respective front legs to their aligned rear legs and slanting downwardly toward the rear. A pair of forward and rearward seat crossbars are connected between the side rails, these crossbars being spaced inwardly of the front and rear edges of the seat so that they are concealed by the seat. The seat comprises a cushion built on a frame which includes a rear frame member supported on the rear seat crossbar, a pair of side frame members supported on the side rails and projecting beyond the front legs, and a third frame member connecting the front ends of the side frame members. The back comprises a cushion mounted on a frame which includes a bottom frame member supported on the rear seat crossbar, a pair of upright frame members extending diagonally upwardly and rearwardly from the ends of the bottom frame member, and a top frame member connecting the tops of the upright frame members. An intermediate frame member extends between the upright frame members centrally of their length, and is attached rigidly to the back engaging crossbar.

To promote the comfort of the sitter, the seat is tilted downwardly toward the rear at an angle of 7½° with the horizontal. The back of the chair makes an angle of 113° with the seat. The back is provided just below its center with a forwardly opening obtuse angle of substantially 162½°.

Other objects and advantages of the invention may become apparent from a consideration of the following description and claims, taken together with the accompanying drawings.

Figure 1:
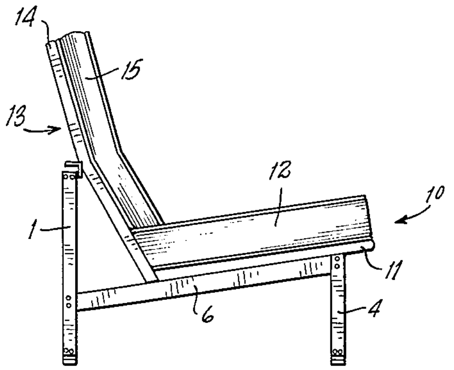
Fig. 1 is a side elevational view of a chair embodying the invention.

*Figs. 1, 2 and 5 to 10*

These figures illustrate a chair embodying the principal features of my invention. The frame of the chair (Fig. 5) comprises two rear legs 1 and 2 connected by a back engaging crossbar 3 attached at its ends to the tops of the legs by a structure to be described in detail below. The frame also includes front legs 4 and 5 whose upper ends are connected to intermediate points on the rear legs by side rails 6 and 7, resectively. A forward seat crossbar 8 is attached at its ends to the side rails 6 and 7 at points spaced rearwardly of the upper ends of the legs 4 and 5. A rearward seat crossbar 9 is attached at its ends to the side rails 6 and 7 at a point spaced forwardly of the rear legs 1 and 2.

Mounted on the chair frame is a seat generally indicated by the reference numeral 10 (Fig. 1) and consisting of a wooden frame generally indicated by the reference numeral 11 (see Fig. 7) and a cushion 12, both covered by suitable upholstery material. Also mounted on the chair frame is a back generally indicated at 13 and comprising a wooden frame 14 (Fig. 6) and a cushion 15, both also covered by upholstery material. The cushions 12 and 15 are mounted on their respective frames 11 and 14 by conventional structures, not shown.

Figure 2:
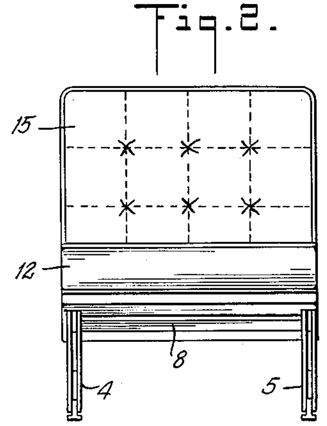
Fig. 2 is a front elevational view of the chair of Fig. 1.
Figure 3:
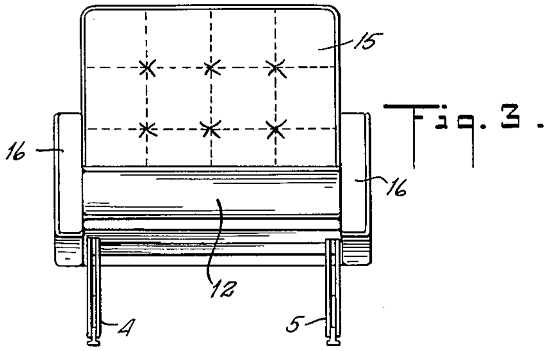
Fig. 3 is a front elevational view of a chair similar to the chair of Fig. 2, except that it is provided with arms.

The chair of Fig. 3 differs from the chair of Fig. 2 only by the addition of a pair of arms 16, each consisting of a wooden frame 17 (Fig. 7A) covered with upholstery material.

Figure 4:
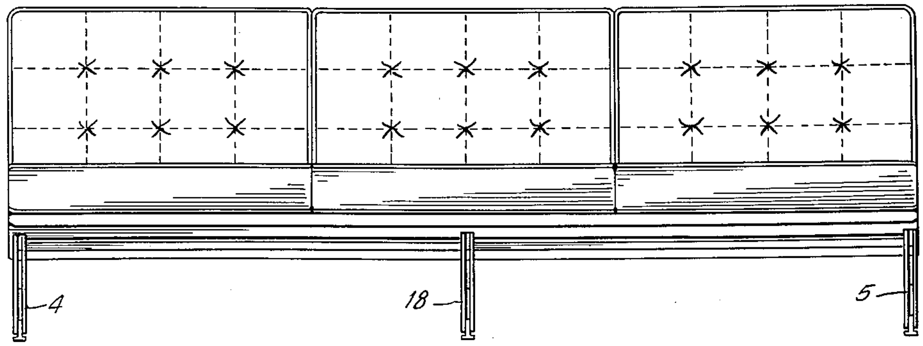
Fig. 4 is a front elevational view of a sofa constructed in accordance with the invention.

The sofa of Fig. 4 is constructed generally similarly to the chair of Figs. 1 and 2 except that the crossbars are considerably elongated, center legs 18 and 19 (see Fig. 13) are provided, and the back and seat cushions are divided into three sections each.

Each of the four legs or columns 1, 2, 4 and 5 is constructed from two spaced parallel metal bars of rectangular cross-section held together at their ends by base and cap structures. The rear legs are also held together at intermediate points where they are joined by the side rails. The leg structures and end connectors are claimed, as such, in my application Serial No. 594,740, mentioned above.

Figures 8, 10:
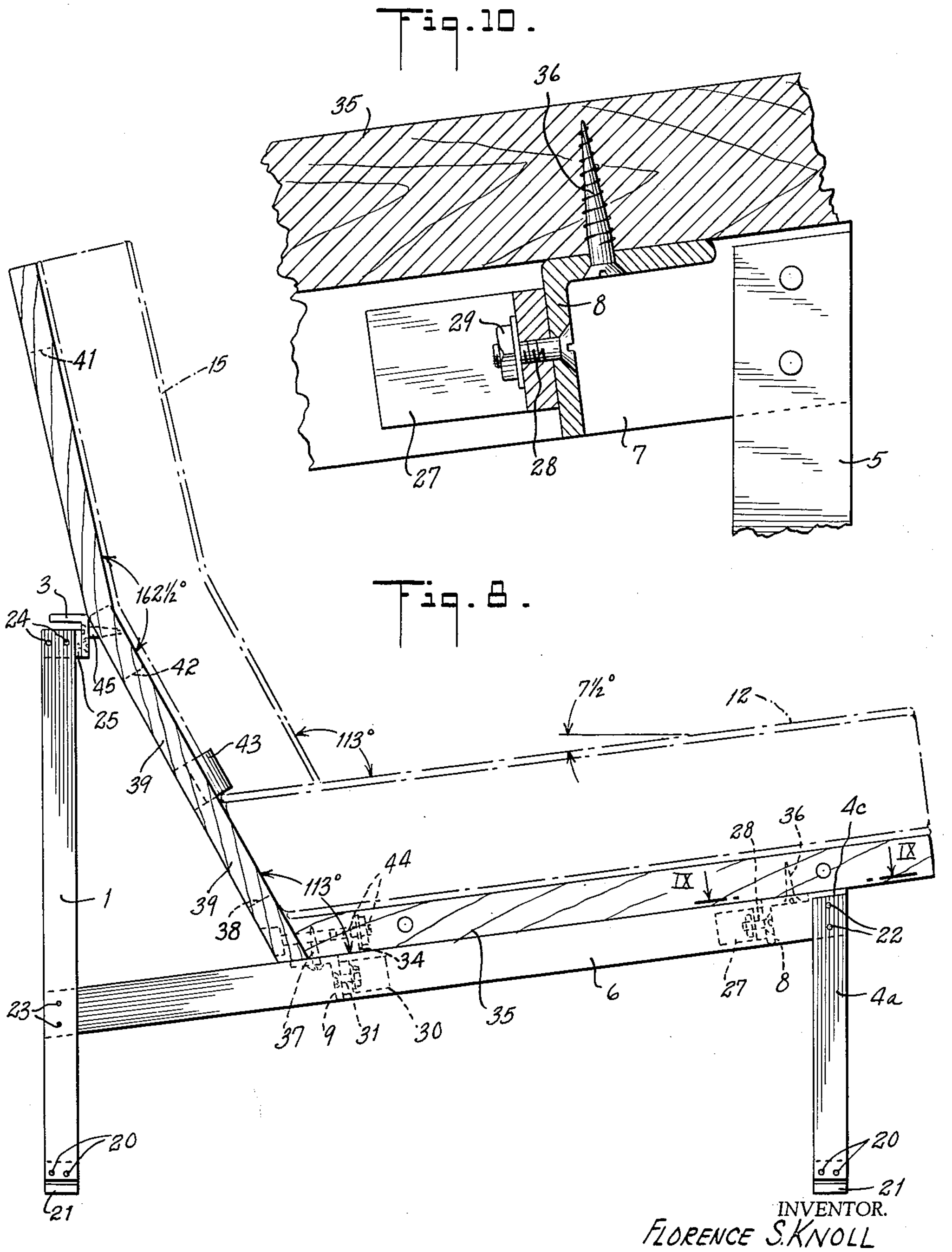
Fig. 8 is a side view of the chair of Figs. 1 and 2, with the cushions shown in dotted lines, and taken on a considerably enlarged scale.
Fig. 10 is a fragmentary cross-sectional view taken on the line X—X of Fig. 9.
Figure 11:
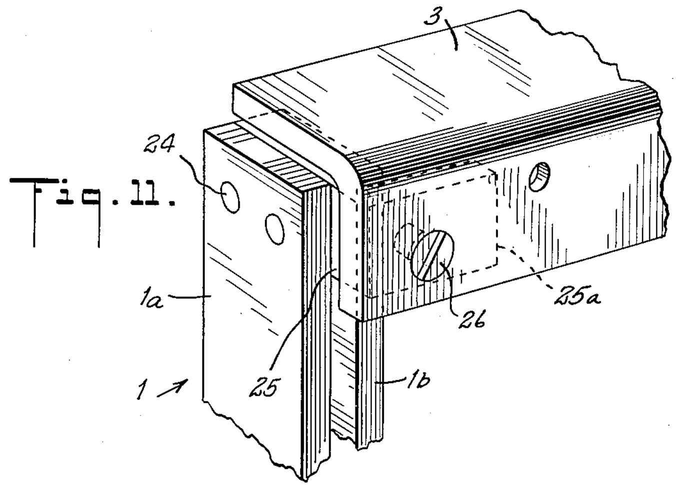
Fig. 11 is a fragmentary perspective view illustrating the structure of the upper end of one of the rear legs of the chair of Fig. 8.

The rear end of the side rail 6 is fastened to the rear leg 1 by means of rivets 23 (Fig. 8). The holes in the rear leg 1 for the rivets 23 must be located carefully, with respect to their spacing from the foot holding rivets 20. The connection between the back engaging crossbar 3 and the upper end of the leg 1 is illustrated in detail in Fig. 11. The leg 1 is there shown as comprising two metal bars **1*a* and 1*b*, of rectangular cross-section, held together at their upper ends by means of rivets 24. The rivets 24 retain between the upper ends of the bars 1*a* and 1*b* an L-shaped bracket 25 which projects forwardly from between the bars 1*a* and 1*b* and has on its forward end a laterally extending arm 25*a*. The back engaging crossbar 3 is an angle iron of L-shaped cross-section and is held in place on the bracket 25 and the corresponding bracket at the other end by means of machine screws 26, one of which is shown in Fig. 11, and which is threaded into the leg 25*a* of bracket 25**.

Figure 11A:
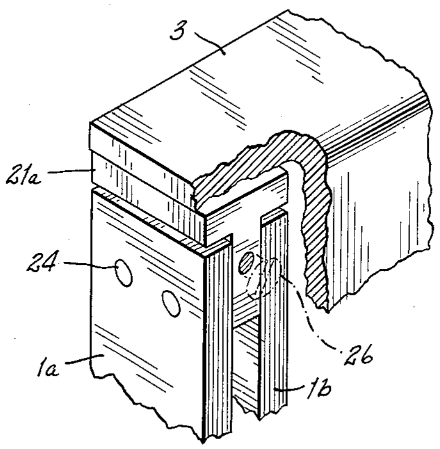
Fig. 11A is a view similar to Fig. 11, illustrating a modification.

Fig. 11*a* illustrates a modified form of connection between the back engaging crossbar 3 and the upper end of the leg 1. In this modification, a T-shaped piece **21*a*, generally similarly in structure to the foot 21, has its upright received between the ends of the bars 1*a* and 1*b* and its crosspiece extending horizontally. The end of the crossbar 3 is fastened to the upright of the T-shaped piece 21*a* by a screw 26, and the horizontal flange of the crossbar 3 rests against the top of the head of the T-shaped piece 21*a*. As in the previous modifications, the dimension between the holes which receive the rivets 24 and the ends of the bars 1*a* and 1*b* is not critical. For purposes of external appearance, it is desirable to make the clearances between the ends of the bars 1*a* and 1*b* and the head of the T-shaped piece 21*a* as small as conveniently possible. Nevertheless, that dimension is not a functional one, and need not be closely held. In Fig. 11A, as in similar structures throughout the specification and drawings, the spacing between the end of the bars 1*a*, 1*b* and the head of the T-shaped piece 21*a*** has been somewhat exaggerated in order to emphasize the non-critical character of the latter dimension.

The foot 21 and the bracket 25, Fig. 8, cooperate to render the overall dimensional length of the bars **1*a* and 1*b* relatively unimportant. The holes for the rivets 24 must be accurately located, as must the holes for the rivets and for the screw 26 in the bracket 25. Likewise the holes in the crossbar 3 for the screws 26** must be located accurately.

Figure 9:
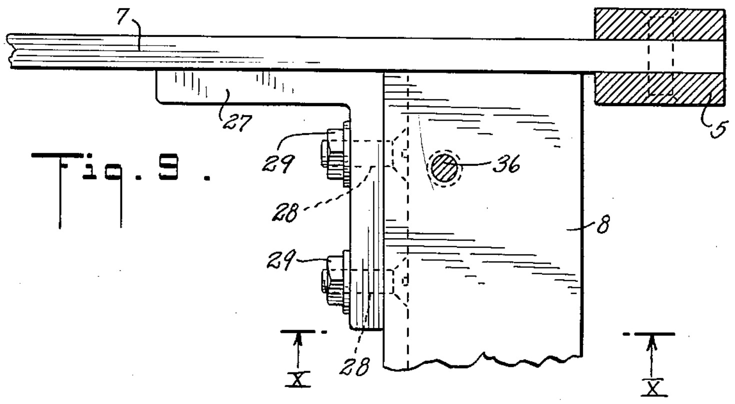
Fig. 9 is a fragmentary sectional view on an enlarged scale taken on the line IX—IX of Fig. 8.

The front crossbar 8 is attached at its ends to the side rails 6 and 7 in a manner best illustrated in Figs. 9 and 10. L-shaped brackets 27 are welded to the side rails 6 and 7. The projecting arms of the brackets are threaded to receive bolts 28 which extend through suitable apertures in the crossbar 8 and are held in place by nuts 29. The rear crossbar 9 is attached to the side rails 6 and 7 in a similar fashion by means of brackets 30 (see Fig. 8) welded to the side rails 6 and 7 and apertured to receive bolts 31 which extend through the crossbar 9 near its ends and are held in place by nuts 32.

The seat frame 11 consists of front and rear frame members 33 and 34 and side frame members 35, held together at the corners in any suitable conventional fashion. The side frame members 35 are held in place on the chair frame by wood screws 36 (see Fig. 10), which extend through apertures provided in the ends of the crossbars 8 and 9. The rear frame member 34 is held in place by means of wood screws 37 (Fig. 8) which extend through the rear crossbar 9.

The seat cushion 12 may comprise a layer of foam rubber with a covering of suitable sheet material, which covering also extends over the outer surfaces of the seat frame 11, being fastened thereto in a conventional manner. The back side of the cushion 12 is contoured to conform with the front of the back frame 14.

*The back frame*

The back frame 14 (see Fig. 6) comprises a bottom frame member 38, a pair of upright frame members 39 and 40, a top frame member 41 connecting the upper ends of the upright frame members 39 and 40 and intermediate frame members 42 extending between the frame members 39 and 40, and a forwardly bowed rail 43, which spans the lower panel of the back frame at an intermediate point, just above the level of the upper surface of the seat cushion 12, as best shown in Fig. 8.

The intermediate frame member 42 divides the back frame into upper and lower panels. The side rails 39 and 40 are provided with upper and lower portions forming therebetween forwardly opening obtuse angles of substantially 162½° adjacent the ends of the frame member 42. The bottom ends of the upright frame members 39 and 40 abut against the rear ends of the side frame members 35 of the seat cushion frame. The lower ends of the upright frame members 39, 40 make an angle of substantially 113° with the side rails 6 and 7. The rear ends of the side frame members 35 and the rear side of rear frame member 34 are contoured with an equal dihedral angle so that the back frame and seat frame fit each other closely.

The bottom frame member 38 is bolted to the rear frame member 34 of the seat by means of bolts 44 (see Fig. 8). Wood screws 45 extend through the back engaging crossbar 3 and are threaded into the intermediate frame member 42 of the back frame. The back cushion 15 conforms generally to the back frame 14, and is constructed with an angle in its central portion corresponding to the angle of 162½° in the back frame. The lower edge of cushion 15 does not extend all the way to the bottom of frame 14, however, but terminates at the upper surface of the seat cushion 12.

It has been found that the back and seat cushion structures such as those illustrated and described, including a back having an upper portion more nearly vertical than the lower portion and related thereto by an angle of substantially 162½°, together with a seat making an angle with the lower portion of the back of substantially 113°, and itself making an angle with the horizontal of 7½°, provides increased comfort for the sitter as compared to prior art seat and back structures. The angle of 162½° in the middle of the back is particularly important, since it provides a back structure which follows reasonably closely the contour of the back of a sitting person, so that the back of such a person is supported throughout its length. The bowed rail 43 provides support for the lower edge of the back cushion and prevents it from being bulged out backwardly.

The back cushion 15 may comprise a layer of foam rubber with a covering of suitable sheet material, which covering also extends over the outer surfaces of the back frame 14, being fastened thereto in a conventional manner.

Figures 12, 13, 14:
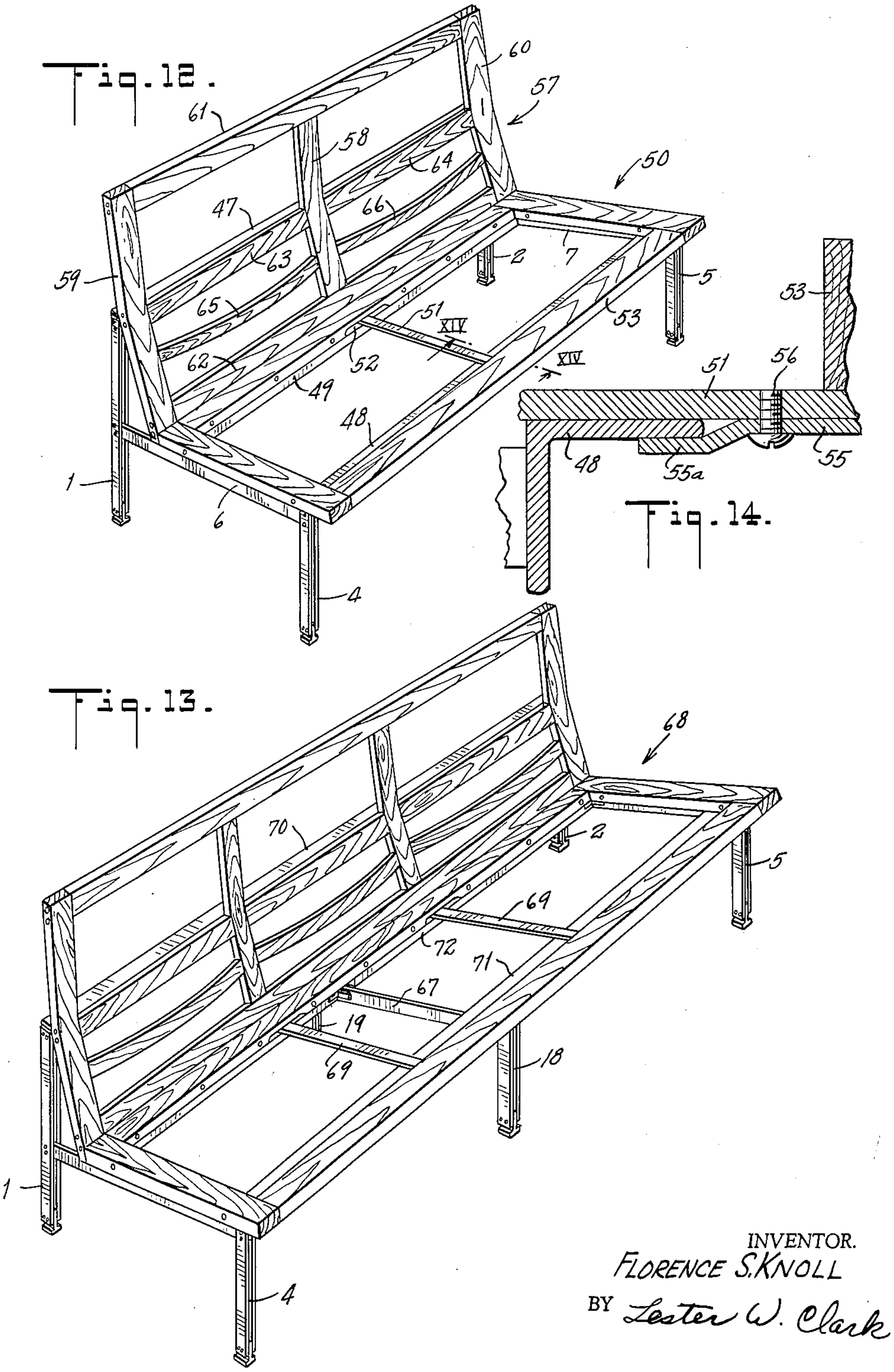
Fig. 12 is a perspective view of a sofa frame embodying the invention.
Fig. 13 is a perspective view of another embodiment of the invention in a sofa frame.
Fig. 14 is a cross-sectional view on an enlarged scale taken on the line XIV—XIV of Fig. 12, looking in the direction of the arrows.

*Sofas—Figs. 12 to 14*

Fig. 12 illustrates a sofa constructed in a manner similar to the chair of Figs. 1 to 11A. Those parts of the sofa frame illustrated in this figure which correspond fully to their counterparts in the previous figures have been given the same reference numerals and will not be further described. The leg structures and the side rails are generally the same as in the chair.

A top back engaging crossbar 47 connects the upper ends of the legs 1 and 2 and seat crossbars 48 and 49 connect the side rails 6 and 7. These crossbars differ from the crossbars 3, 8 and 9 of Fig. 5 principally in being longer. The seat frame for the sofa of Fig. 12 is generally indicated at 50 and differs from the seat frame 11 of Fig. 7 principally in being longer. The seat frame 50 is provided with a central transverse rail 51 which has its ends received in grooves or rabbets, one of which is shown at 52, formed in the under sides of the front and rear frame members 53 and 54 of the seat frame 50. On the under side of the transverse rail 51 there is fixed, as shown in Fig. 14, a small plate 55. The plate 55 has its rearward end offset downwardly as shown at 55*a* in Fig. 14, to form a hook for receiving the leading edge of the forward crossbar 48. The plate 55 is held in place on the rail 51 by means of a screw 56.

Figures 5, 6, 7, 7A:
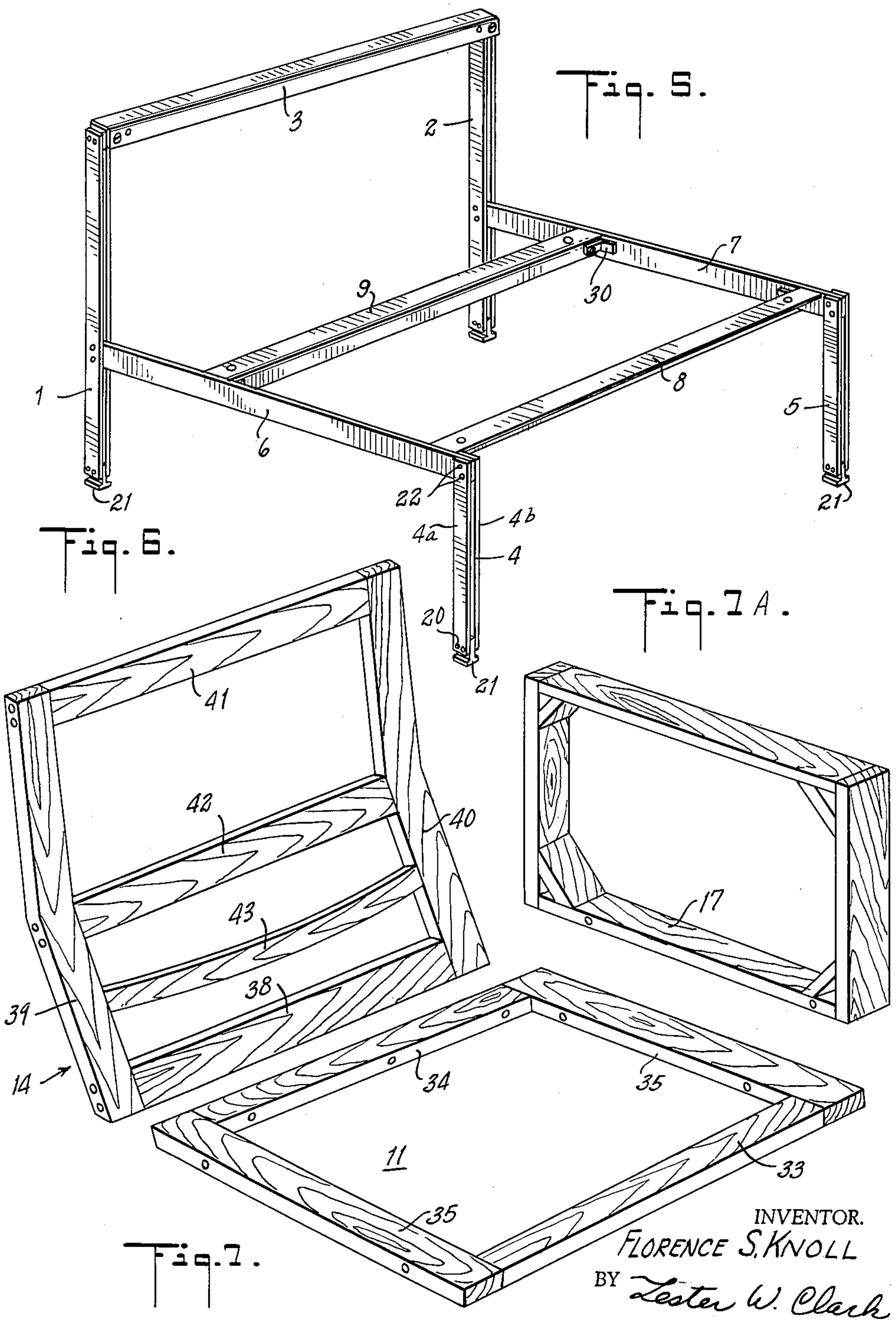
Fig. 5 is a perspective view of the frame of the chair of Figs. 1 and 2.
Fig. 6 is a perspective view of the back cushion frame of the chair of Figs. 1 and 2.
Fig. 7 is a perspective view of the seat cushion frame of the chair of Figs. 1 and 2.
Fig. 7A is a perspective view of the arm frame used in the chair of Fig. 3.

The back frame 57 of the sofa of Fig. 12 is generally similar to the back frame 14, but additionally includes a center upright frame member 58, which separates the back frame into two laterally adjacent panels. The frame 57 also includes upright frame members 59 and 60 at its ends, top and bottom frame members 61 and 62, intermediate transverse frame members 63 and 64 and forwardly bowed rails 65 and 66. The intermediate upright frame member 58 extends between the top and bottom frame members 61 and 62, being attached thereto in any suitable manner. Each of the two laterally adjacent panels of the frame 57 corresponds generally to the single back frame for a chair as shown in Fig. 6.

The sofa of Fig. 13 is generally similar to the sofa of Fig. 12, except that it is somewhat longer, having back and seat frames of three panels each instead of two panels. At the center of the middle panel, this sofa is provided with another set of front and rear legs 18 and 19, which are connected by a transverse rail 67.

The seat frame is generally indicated at 68 and is generally similar to the seat frame 50 except that it is longer and has two spaced transverse reinforcing members 69, corresponding to the reinforcing member 51 of Fig. 12. The sofa of Fig. 13 is provided with crossbars 70, 71 and 72, corresponding to the crossbars 47, 48 and 49 of Fig. 12, except that they are longer.

Figures 15, 16, 17:
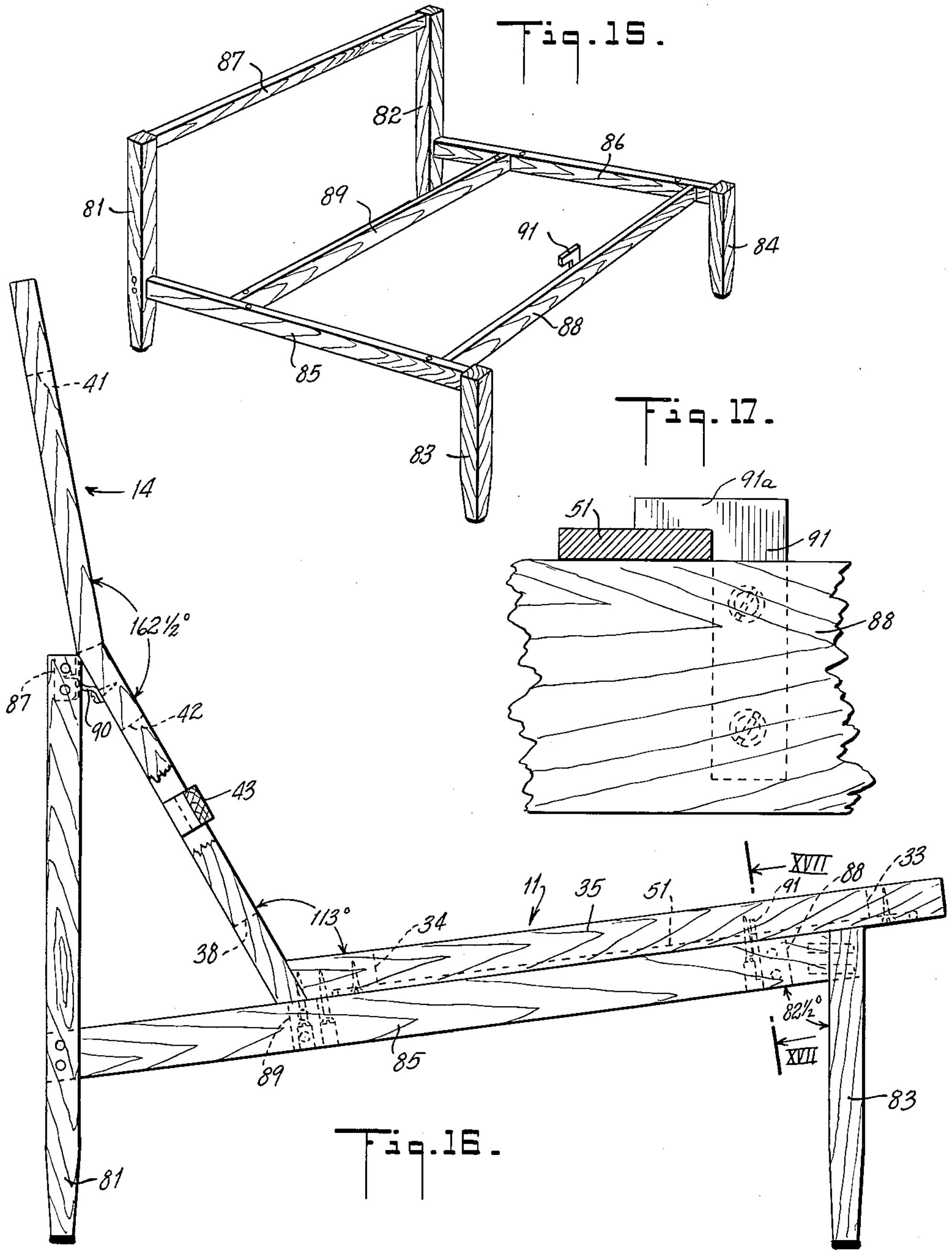
Fig. 15 is a perspective view of a chair frame similar to the frame of Fig. 5, but constructed of wood, instead of metal.
Fig. 16 is a side elevational view of the frame of Fig. 15, on an enlarged scale, and with seat and back cushion frames added.
Fig. 17 is a cross-sectional view, on an enlarged scale, taken on the line XVII—XVII of Fig. 16.

*Figs. 15 and 16*

These figures illustrate a wooden frame for a chair, including many features of the metal frame illustrated in the previous figures. The frame of Figs. 15 and 16 includes rear legs 81 and 82, front legs 83 and 84, side rails 85 and 86, a top crossbar 87 and front and rear seat crossbars 88 and 89. This frame, as best seen in Fig. 16, supports a seat cushion frame 11 and a back cushion frame 14, which are substantially the same as the structures illustrated in Figs. 7 and 6, respectively. The frame members of the seat and back are held together by dowels, pins and tenons in any suitable conventional manner. The angular relationships described in connection with the chair and sofa set forth above are maintained in the frame of Figs. 15 and 16. That is to say, the seat frame slants toward the rear at an angle of 82½° with the vertical front leg. The lower portion of the back frame makes an angle of 113° with the seat frame and the upper and lower portions of the back frame make an angle of 162½° with each other. The back engaging crossbar 87 is attached to the intermediate frame member 42 of the back frame by means of a number of brackets 90 (see Fig. 16). Each bracket 90 is provided with a central double bend, so that one end is flush with the inner surface of the top crossbar 87 and the other end is flush with the rear of the intermediate frame member 42. These ends of the brackets 90 are held in place on the crossbar and frame member by means of wood screws.

In those chairs or sofas where an intermediate reinforcement in the seat cushion frame is desired, the rear side of the front crossbar 88 has attached to it an L-shaped plate 91 (see Figs. 15 and 17). The L-shaped plate 91 is inverted, so that the short leg 91*a* of the L-shaped plate projects horizontally from its upper end. The leg 91*a* of the L is adapted to overlie and engage the upper surface of a reinforcing bar 51 (Fig. 17) for the seat frame such as that shown in detail in Fig. 12.

While I have shown and described certain preferred embodiments of my invention, other modifications thereof will readily occur to those skilled in the art, and I therefore intend my invention to be limited only by the appended claims.

I claim:

1. A chair or the like, comprising a chair frame having two side frame assemblies each including a rear leg, a front leg substantially shorter than said rear leg, and a side rail connecting said legs, a back engaging crossbar connecting the tops of the rear legs, a rearward seat crossbar connecting the side rails forwardly of said rear legs, and a forward seat crossbar connecting the side frame assemblies and spaced forwardly from the rearward seat crossbar; a seat frame comprising a rear frame member supported on the rearward seat crossbar, a pair of side frame members respectively extending forwardly from the ends of said rear frame member and projecting beyond said front legs, and a front frame member connecting the front ends of said side frame members; a seat cushion supported on said seat frame; a back frame comprising a bottom frame member supported on said rearward seat crossbar and abutting the rear frame member of the seat frame, a pair of upright frame members inclined upwardly and rearwardly from the ends of said bottom frame member, a top frame member connected between the tops of said upright frame members, and an intermediate frame member connected between said upright frame members; means connecting said bottom frame member, said rear frame member and said rearward seat crossbar rigidly together, means connecting said intermediate frame member rigidly to said back engaging crossbar; and a back cushion supported on the back frame.

2. A chair or the like as defined in claim 1, in which said forward seat crossbar is spaced rearwardly from said front frame member of the seat frame, and is concealed by the seat cushion.

3. A chair or the like as defined in claim 1, in which said upright frame members of the back frame each have upper and lower portions of their lengths disposed to form therebetween an obtuse angle located centrally thereof, so that the upper portion of the back frame is more nearly vertical than the lower portion.

4. A chair or the like as defined in claim 3, in which said obtuse angle is substantially 162½°, and the lower portions of said upright frame members make an angle of substantially 113° with the side rails, said side rails making an angle of substantially 7½° with the horizontal.

5. A chair or the like, comprising a chair frame including a pair of vertical rear legs, a back engaging crossbar connecting the top of said legs, a pair of vertical front legs substantially shorter than said rear legs, a pair of side rails connecting the respective rear legs to the tops of the front legs, forward and rearward seat crossbars connecting said side rails, said rearward seat crossbar being spaced forwardly from said rear legs; a seat frame comprising a rear frame member supported on the rearward seat crossbar, a pair of side frame members extending forwardly from the ends of said rear frame member and projecting beyond said front legs, a front frame member connecting the front ends of said side frame members, an intermediate member extending between said rear and front frame members and parallel to and spaced from said side frame members, and means rigidly connecting said intermediate member to one of said seat crossbars.

6. A chair or the like comprising a chair frame including a pair of rear legs extending generally vertically, a back engaging crossbar connecting the top portions of said legs, a pair of front legs extending generally vertically, a pair of side rails connecting the respective rear legs to said front legs, forward and rearward seat supporting crossbars connecting said side rails, said rearward seat supporting crossbar being spaced forwardly from said rear legs; a seat frame comprising a rear frame member supported on said rearward seat supporting crossbar, a pair of side frame members extending forwardly from said rear frame member, a front frame member connecting the front ends of said side frame members; a back frame having a bottom frame member engaging said rear frame member of said seat frame, a pair of frame members inclined upwardly and rearwardly from said bottom frame member, a top frame member connecting the top portions of said inclined frame members, said inclined frame members each having upper and lower portions of their lengths disposed to form therebetween a forwardly opening obtuse angle; means rigidly connecting said bottom frame member of said back frame to said rear frame member of said seat frame, means rigidly connecting said back frame to said back engaging crossbar, and means connecting said seat frame to said forward and rearward seat supporting crossbars.

7. A chair or the like comprising a chair frame including a pair of rear legs extending generally vertically, a back engaging crossbar connecting the top portions of said legs, a pair of front legs extending generally vertically, a pair of side rails connecting the respective rear legs to said front legs, forward and rearward seat supporting crossbars connecting said side rails, said rearward seat supporting crossbar being spaced forwardly from said rear legs; a back frame having a bottom frame member supported adjacent said rearward seat supporting crossbar, a pair of frame members inclined upwardly and rearwardly from said bottom frame member, a top frame member connecting the top portions of said inclined frame members, an intermediate transverse frame member joining intermediate points on said inclined frame members and separating said back frame into upper and lower panels, means rigidly connecting said bottom frame member of said back frame to said rearward seat supporting crossbar, means rigidly connecting said back frame to said back engaging crossbar, and seat means supported by said rearward and said forward seat supporting crossbars.

8. A chair or the like as defined in claim 7 in which said intermediate transverse frame member is disposed adjacent said back engaging crossbar, and means rigidly connecting said intermediate transverse frame member to said back engaging crossbar.

9. A chair or the like as defined in claim 7 in which said inclined frame members each have upper and lower portions of their lengths disposed to form therebetween forwardly opening obtuse angles adjacent said intermediate points on said inclined members.

10. A chair or the like comprising a chair frame including a pair of rear legs extending generally vertically, a back engaging crossbar connecting the top portions of said legs, a pair of front legs extending generally vertically, a pair of side rails connecting the respective rear legs to said front legs, forward and rearward seat supporting crossbars connecting said side rails, said rearward seat supporting crossbar being spaced forwardly from said rear legs; a back frame having a bottom frame member supported adjacent said rearward seat supporting crossbar, a pair of frame members inclined upwardly and rearwardly from said bottom frame member, a top frame member connecting the top portions of said inclined frame members, a forwardly bowed rail spanning between and attached at its ends to said inclined frame members, means rigidly connecting said bottom frame member of said back frame to said rearward seat supporting crossbar, means rigidly connecting said back frame to said back engaging crossbar, and seat means including a cushion supported by said rearward and said forward seat supporting crossbars, said forwardly bowed rail being disposed adjacent and above the upper surface of said seat cushion.

References Cited in the file of this patent

UNITED STATES PATENTS

| | | |
|---|---|---|
| D. 90,495 | McChesney et al. | Aug. 15, 1933 |
| D. 165,788 | Risom | Jan. 29, 1952 |
| D. 177,081 | Wells | Mar. 6, 1956 |
| D. 177,366 | Cutrow | Apr. 10, 1956 |